Feb. 24, 1942.     R. E. DAVIS     2,274,191
BROACHING MACHINE
Filed Dec. 17, 1938     3 Sheets-Sheet 1

INVENTOR.
RICHARD E. DAVIS
BY
ATTORNEY.

Feb. 24, 1942.   R. E. DAVIS   2,274,191
BROACHING MACHINE
Filed Dec. 17, 1938   3 Sheets-Sheet 2

INVENTOR.
RICHARD E. DAVIS
BY
ATTORNEY.

Patented Feb. 24, 1942

2,274,191

UNITED STATES PATENT OFFICE 2,274,191

BROACHING MACHINE

Richard E. Davis, Milwaukee, Wis., assignor to The Oilgear Company, Milwaukee, Wis., a corporation of Wisconsin Application December 17, 1938, Serial No. 246,292

19 Claims. (Cl. 90—33)

This invention relates to the control of machines of the type having two slides or carriages which are operated in sequence and in directions at right angles to each other, such as a broaching machine having a carriage or slide for moving a piece of work into and out of the path of a tool carried by another carriage or slide which reciprocates along a path at right angles to the path of the work carriage.

A machine of this type is ordinarily provided with a control which causes both of its carriages to stop in fully retracted positions and which when operated will first cause the work carriage to advance and will then cause the tool carriage to advance so that a tool fixed thereon may operate upon a piece of work fastened to the work carriage.

It sometimes happens that the tool carriage will partly or fully advance during a non-operating period due to someone manipulating the control or, in the case of a carriage which is reciprocated in a vertical plane by a hydraulic motor, to liquid escaping from the lower end of the motor.

If the machine is started when the tool carriage is partly or fully advanced, the work carriage will thrust the work against the tool and thereby damage the tool, the work or the machine.

The present invention has an object to provide a machine of this character with a control which will prevent the work from being thrust against the tool.

Another object is to provide a machine having a control which when operated to start the machine will cause the tool carriage to first return to its fully retracted position if it has advanced therefrom.

Another object is to provide a machine of this character with a control which when operated to start the machine will cause the tool carriage to first return to its fully retracted position if it has advanced therefrom and which may be adjusted to cause the machine to operate either automatically or semi-automatically.

Another object is to provide a machine of this character with a control which may be adjusted to cause the machine to operate semi-automatically and which when operated to start the machine will cause the tool carriage to return to and stop in its fully retracted position.

Another object is to provide a machine of this character with a control which may be adjusted to cause the machine to operate automatically and which when operated to start the machine will cause the tool carriage to first return to its fully retracted position and then advance after the work carriage has advanced.

Another object is to provide a machine of this character with improved electrically operated control.

Other objects and advantages of the invention will appear from the description hereinafter given of the broaching machine shown schematically in the accompanying drawings in which the views are as follows.

The machine chosen for illustration has its mechanism carried by a frame 1 which is arranged upon a base 2 and provided at its front with a knee 3 having horizontal guides or ways 4 arranged thereon.

The work to be operated upon is clamped in a fixture (not shown) fastened to a work carriage or slide 5 which is mounted upon ways 4 and adapted to be reciprocated thereon to move the work into and out of the path of a broaching tool (not shown) carried by a vertical reciprocal tool carriage or slide 6.

In practice, work carriage 5 is connected by a link to a crank fixed upon a shaft which is rotated by a reciprocating hydraulic motor through a rack and pinion, and the stroke of the motor is such that the crank is on dead center when carriage 4 is fully advanced so that substantially no force is transmitted to the motor by the thrust of the tool against the work as fully illustrated and described in Patent No. 2,190,642.

Figures 1, 2, 4, 5:
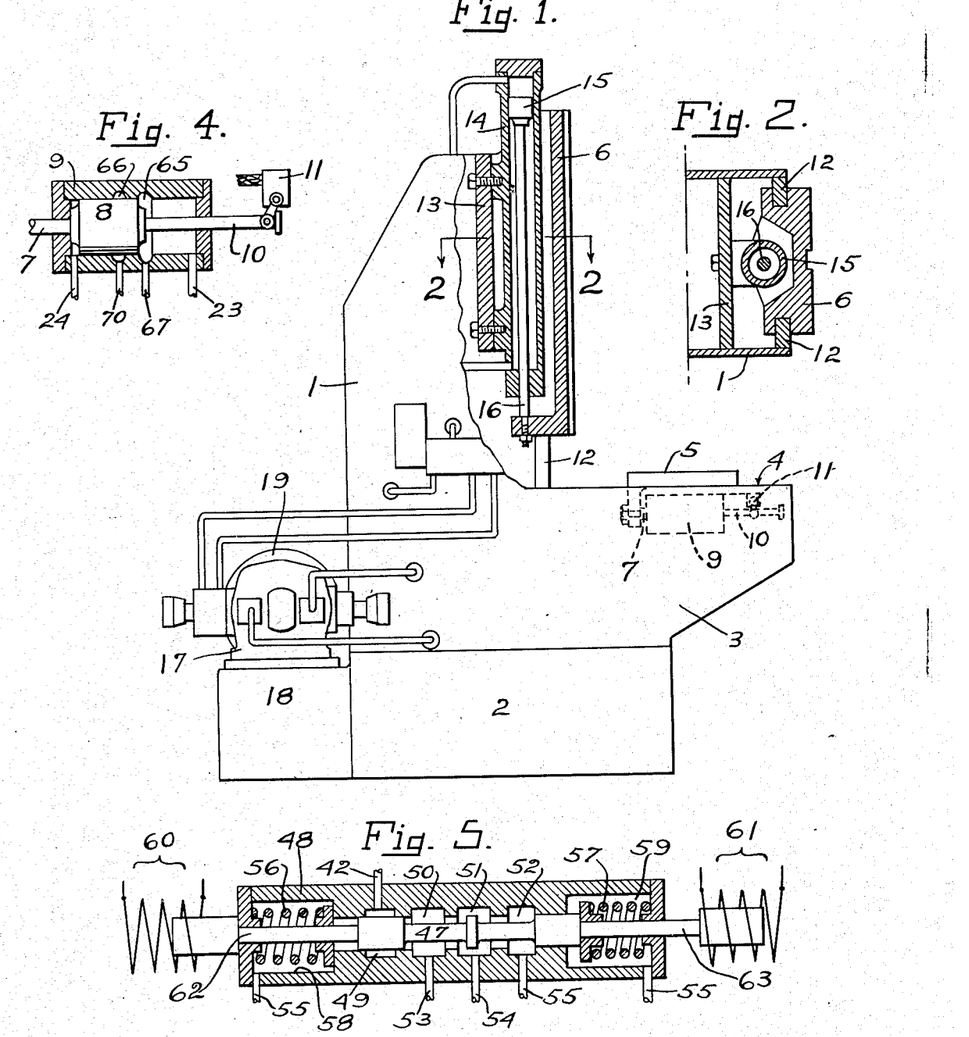
Fig. 1 is a side elevation partly in section of a broaching machine to which the invention has been applied.
Fig. 2 is a sectional plan view taken on the line 2—2 of Fig. 1.
Fig. 4 is a view showing the work carriage motor with its piston in the position occupied when the work carriage is advanced.
Figs. 5 and 6 are views showing the control valve with its valve member in positions different from that shown in Fig. 3.
Figures 3, 7:
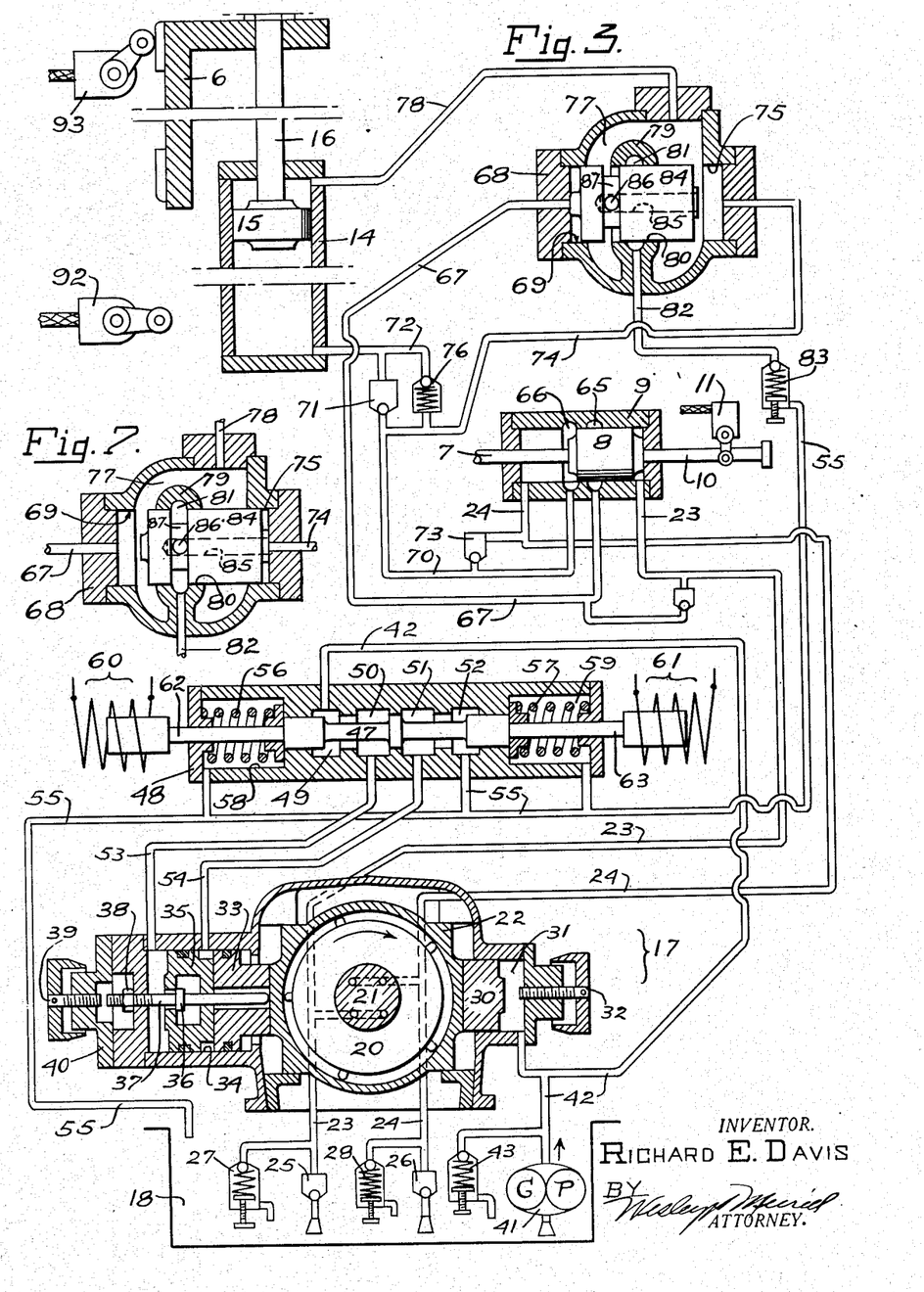
Fig. 3 is a diagram of the hydraulic circuit and shows the several parts in the positions occupied when the machine is idle.
Fig. 7 is a view showing a differential valve with its valve member in a position different from that shown in Fig. 3.

For the purpose of illustration, however, carriage 5 has been shown as being connected directly to the piston rod 7 of a piston 8 which, as shown in Figs. 3 and 4, is fitted in a stationary cylinder 9 and provided with a tail rod 10 for operating a limit switch 11.

Frame 1 has two parallel vertical ways 12 arranged at its front and a cross member 13 arranged behind ways 12 and connecting the two sides of the frame to each other as shown in Fig. 2.

Tool slide 6 is fitted between and reciprocated upon ways 12 by a hydraulic motor consisting of a cylinder 14, which is fastened in a vertical position to cross member 13, and a piston 15 which is fitted in cylinder 14 and connected by a rod 16 to slide 6 at the lower end thereof.

The hydraulic circuit

Liquid for operating motors 8—9 and 14—15 is supplied by a reversible pump 17 which is mounted upon a stationary reservoir 18 and driven by an electric motor 19.

While any suitable pump will suffice, pump 17 has been shown as being of the rolling piston type which is fully illustrated and described in Patent No. 2,074,068. It is deemed sufficient to state herein that pump 17 has its cylinders arranged radially in a cylinder barrel 20 (Fig. 3) which is journaled upon a stationary valve shaft or pintle 21 having ports and passages formed therein through which liquid flows to and from the cylinders, that the outer ends of the pistons react against the annular inner surface of a reaction member carried by a thrust member or slide block 22, that no liquid will be discharged by pump 17 when slide block 22 is in its central or neutral position at which time its axis coincides with the axis of cylinder barrel 20, and that pump 17 will deliver liquid in a direction and at a rate dependent upon the direction and distance slide block 22 is shifted from its neutral position. As shown, pump 17 is adapted to deliver liquid into one and have liquid returned to it through the other of two channels 23 and 24 which are connected to pintle 21 in communication with the passages formed therein.

Since motor 14—15 is of the differential type so that, when operating, liquid is discharged therefrom at rates which are always either in excess of or less than the rate required to supply pump 17 with liquid, channels 23 and 24 communicate at points intermediate their ends with pintle 21 and have their lower ends extended into reservoir 18 and provided, respectively, with check valves 25 and 26 which permit pump 17 to draw liquid from reservoir 18 but prevent liquid from escaping from channels 23 and 24 into reservoir 18.

In order to protect the pump from being overloaded, the pressure created thereby is limited by one or the other of two relief valves 27 and 28 which are connected, respectively, to channels 23 and 24 above check valves 25 and 26 and discharge into reservoir 18.

When slide block 22 is shifted toward the right from its neutral position, pump 17 will discharge liquid into channel 23 and have liquid returned to it through channel 24 and, when it is shifted toward the left from its neutral position, pump 17 will discharge liquid into channel 24 and have liquid supplied to it through channel 23.

Slide block 22 is at all times urged toward the left by liquid acting upon a piston 30 which is connected to or in engagement with slide block 22 and is fitted in a stationary cylinder 31 carried by the casing of pump 17.

An adjusting screw 32 is threaded through the head of cylinder 31 to limit the movement of piston 30 and slide block 22 toward the right. Turning screw 32 will adjust the rate at which pump 17 will discharge liquid into channel 23.

Slide block 22 is adapted to be moved toward the right by liquid acting upon a piston 33, which engages slide block 22 and is fitted in a stationary cylinder 34 carried by the pump casing, and by liquid acting upon a piston 35 which is fitted in cylinder 34 and adapted to engage the outer face of piston 33.

The movement of piston 35 toward the right is limited by a collar 36 fixed on a stop rod 37 which extends loosely through pistons 33 and 35 and through the head of cylinder 34. The inner end of rod 37 is adapted to engage slide block 22 and the outer end of rod 37 is provided with a nut 38 which is adjusted to so position collar 36 that piston 35 when energized will move slide block 22 exactly to its neutral position.

The outer end of rod 37 is adapted to engage an adjusting screw 39 which is threaded through a cap 40 fixed to the head of cylinder 34. Turning screw 39 adjusts the distance that rod 37 and slide block 22 will be moved toward the left and thereby determine the rate at which pump 17 will deliver liquid into channel 24.

Pistons 33 and 35 are larger than piston 30 so that slide block 22 will be moved toward the right when liquid is simultaneously supplied to both of cylinders 31 and 34 at the same pressure.

Liquid for operating pistons 33 and 35 is supplied by a gear pump 41 which is ordinarily driven in unison with pump 17 and arranged in the casing thereof according to the usual practice.

Gear pump 41 draws liquid from reservoir 18 and discharges it into a branched supply channel 42 at a rate in excess of requirements, the excess liquid being exhausted through a relief valve 43 which enables gear pump 41 to maintain in channel 42 a pressure equal to the resistance of relief valve 43.

Supply channel 42 has one of its branches connected to the outer end of cylinder 31 so that piston 30 is constantly urged toward the left by a constant force which is proportional to gear pump pressure.

The delivery of liquid from gear pump 41 to cylinder 34 is under the control of a reversing valve 47 which is fitted in a valve casing 48 and controls communication between four ports 49, 50, 51 and 52 formed in valve casing 48.

Port 49 has the other branch of supply channel 42 connected thereto. Port 50 is connected by a channel 53 to cylinder 34 at or near the outer end thereof. Port 51 is connected by a channel 54 to cylinder 34 at a point between pistons 33 and 35. Port 52 is connected to a drain channel 55 which discharges into reservoir 18.

When valve 47 is in its central position as shown in Fig. 3, pressure extends from channel 42 through valve casing 48 and channel 53 to the left end of cylinder 34 and holds piston 35 against collar 36 on stop rod 37, and the space between pistons 33 and 35 communicates through channel 54 and valve casing 48 with drain channel 55 so that the pressure in cylinder 31 will cause piston 30 to hold slide block 22 against piston 33 and piston 33 against piston 35 in which position of slide block 22 pump 17 is at zero stroke and no liquid will be delivered thereby.

When valve 47 is shifted toward the right to the position shown in Fig. 5, port 49 is blocked and channels 53 and 54 are open to drain channel 55 so that liquid supplied by gear pump 41 to cylinder 31 can cause piston 30 to move slide block 22 toward the left until rod 37 abuts adjusting screw 39 at which time pump 17 will discharge liquid into channel 24 at a rate determined by adjustment of screw 39.

Figure 6:
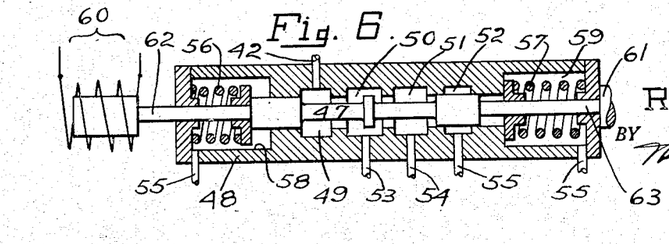

When valve 47 is shifted toward the left to the position shown in Fig. 6, port 52 is blocked and channels 53 and 54 are open to port 49 so that liquid from gear pump 41 can flow through channel 42, valve casing 48 and channels 53 and 54 to cylinder 34 and cause pistons 33 and 35 to move slide block 22 toward the right until piston 30 abuts adjusting screw 32 at which time pump 17 will discharge liquid into channel 23 at a rate determined by the adjustment of screw 32.

Valve 47 is normally held in a central position by two springs 56 and 57 arranged, respectively, in two chambers 58 and 59 which are formed in opposite ends of valve casing 48 and connected to drain channel 55.

Valve 47 is adapted to be shifted in one direction or the other by one or the other of two solenoids 60 and 61 the cores of which are connected, respectively, to valve stems 62 and 63 which are fixed to opposite ends of valve 47 and extend outward through chambers 58 and 59. Solenoids 60 and 61 are controlled in a manner to be presently described.

Channels 23 and 24 are connected to opposite ends of motor cylinder 9 which has two ports 65 and 66 formed therein and so positioned that, when piston 8 has fully retracted work carriage 5, port 65 is blocked and port 66 is open to channel 24 as shown in Fig. 3, and when piston 8 has fully advanced carriage 5, port 66 is blocked and port 65 is open to channel 23 as shown in Fig. 4.

Port 65 is connected by channel 67 to one end of a differential valve casing 68 in communication with bore 69 formed therein, and port 66 is connected by a channel 70 to the inlet of a check valve 71 the outlet of which is connected by a channel 72 to the lower end of cylinder 14.

Channel 70 is also connected to channel 24 through a check valve 73 and to one end of a channel 74 the other end of which is connected to the other end of differential valve casing 68 in communication with a bore 75 formed therein in alinement with bore 69.

Channel 72 is connected to channel 74 through a low pressure resistance valve 76 which resists the discharge of liquid from the lower end of cylinder 14 and thereby prevents the weight of slide 6 from causing it to descend when the machine is idle.

Differential valve casing 68 contains a chamber 77, which is connected by a channel 78 to the upper end of cylinder 14, and an internal projection 79 which is ordinarily formed integral with casing 68 and provided with a bore 80 of the same diameter and in alinement with bore 69 and 75.

Projection 79 has an annular groove 81 formed therein around bore 80 and connected by a channel 82 to the inlet of a resistance valve 83 the outlet of which has drain channel 55 connected thereto.

Bore 80 has fitted therein a valve member 84 which is adapted to extend into and closely fit bores 69 and 75 alternately. Valve member 84 has an axial passage 85 extending inward from its right end and communicating through radial passages 86 with an annular groove 87 which is formed in the peripheral surface of valve member 84 and registers with groove 81 when valve member 84 is shifted toward the right as shown in Fig. 7.

*The electric circuit*

As previously explained, pump 17 is caused to deliver liquid in one direction or the other by energizing solenoid 60 or solenoid 61 to cause valve 47 to be shifted in one direction or the other.

Figure 8:
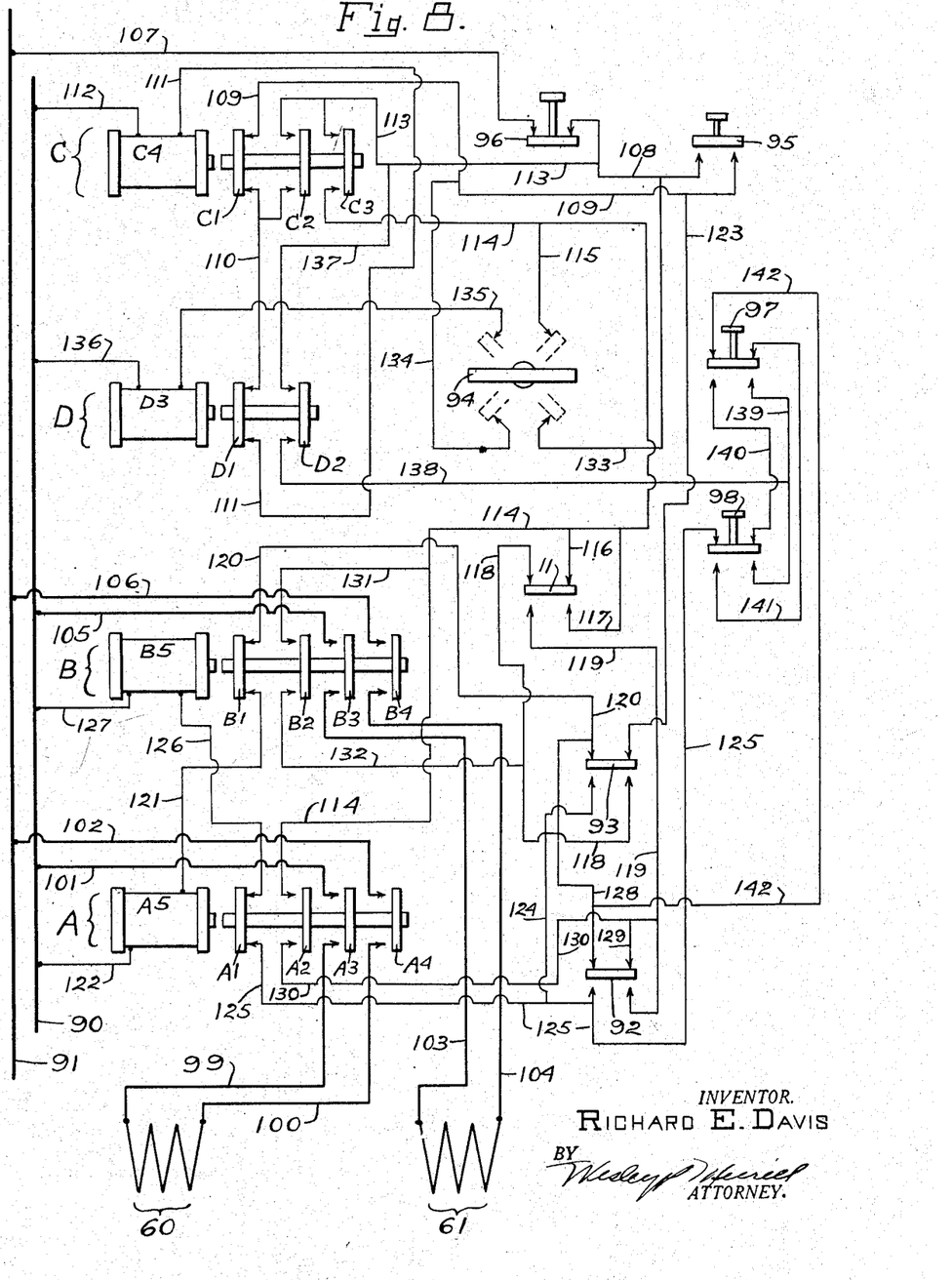
Fig. 8 is a diagram of the electric circuit.

Referring now more particularly to Fig. 8, current for energizing solenoids 60 and 61 is supplied thereto under the control, respectively, of two contactor switches A and B from a power line which has been shown as consisting of two conductors 90 and 91.

Contactor switch A includes four switches A1, A2, A3 and A4 and an electromagnet A5 for operating the switches, and contactor switch B includes four switches B1, B2, B3 and B4 and an electromagnet B5 for operating switches.

Switches A and B are controlled in part by a contactor switch C which includes three switches C1, C2 and C3 and an electromagnet C4 for operating the switches.

Switch C is controlled in part by a contactor switch D which includes two switches D1 and D2 and an electromagnet D3 for operating the switches.

In order to simplify the drawing, contactor switches A, B, C and D have been shown arranged horizontally but in practice they are arranged vertically so that, when the magnets are deenergized, they will operate by gravity to the positions shown.

Switches A and B are also controlled in part by a limit switch 92, which causes slide 6 to be reversed at the end of its down stroke, and by a limit switch 93 which causes slide 6 either to be reversed or to stop at the end of its up stroke. As shown in Fig. 3, slide 6 operates switch 92 at the end of its down stroke and switch 93 at the end of its up stroke.

The machine is adapted to operate either automatically, semi-automatically or to be manually controlled. To this end, it is provided with a selector switch 94 which is operable to three positions as shown in Fig. 8.

If selector switch 94 is adjusted for automatic or semi-automatic operation, the machine may be started by closing a normally open push button switch 95, and it may be stopped at any time by opening a normally closed push button switch 96.

When selector switch 94 is adjusted for manual control, the machine may be controlled by selectively operating two push button switches 97 and 98 each of which is spring biased in a direction to make a connection between one pair of its terminals and to break connection between the other pair of its terminals.

Solenoid 60 has one end of its winding connected to one terminal of switch A3 by a conductor 99 and the other end of its winding connected by conductor 100 to one terminal of switch A4. The other terminals of switches A3 and A4 are connected, respectively, to power conductors 90 and 91 by conductors 101 and 102.

Solenoid 61 has one end of its winding connected to one terminal of switch B3 by a conductor 103 and the other end of its winding connected by a conductor 104 to one terminal of switch B4. The other terminals of switches B3 and B4 are connected, respectively, to power conductors 90 and 91 by conductors 105 and 106.

Stop switch 96 has one of its terminals connected by a conductor 107 to power line 91 and its other terminal connected by a conductor 108 to one terminal of starting switch 95 the other terminal of which is connected to one terminal of switch C1 by a conductor 109.

The other terminal of switch C1 and one terminal of switch C2 are connected by a conductor 110 to one terminal of switch D1 and the other terminal of which is connected by a conductor 111 to one end of the winding of electromagnet C4 which has its other end connected to power line 90 by conductor 112.

The other terminal of switch C2 and one terminal of switch C3 are connected by a conductor 113 to conductor 108 intermediate the ends thereof.

The other terminal of switch C3 is connected to one terminal of switch A2 by a conductor 114 which is connected intermediate its end by a conductor 115 to one terminal of selector switch 94 and by two conductors 116 and 117, respectively, to opposite terminals of limit switch 11.

The third terminal of limit switch 11 is connected by a conductor 118 to one terminal of limit switch 93, and the fourth terminal of limit switch 11 is connected by conductor 119 to a terminal of limit switch 92.

Another terminal of limit switch 93 is connected by a conductor 120 to one terminal of switch B1 the other terminal of which is connected by a conductor 121 to one end of the winding of electromagnet A5 which has the other end of its winding connected to power line 90 by a conductor 122.

A third terminal of limit switch 93 is connected by a conductor 123 to conductor 109 intermediate the ends thereof, and the fourth terminal of limit switch 93 is connected by a conductor 124 to a conductor 125 intermediate the ends thereof.

Conductor 125 is connected intermediate its ends to a second terminal of limit switch 92 and has one of its ends connected to one terminal of switch 98 and its other end connected to one terminal of switch A1, the other terminal of switch A1 being connected by a conductor 126 to one end of the winding of magnet B5 the other end of which is connected by a conductor 127 to power line 90.

The third terminal of limit switch 92 is connected by a conductor 128 to conductor 120 intermediate the ends thereof, and the fourth terminal of limit switch 92 is connected by a conductor 129 to a conductor 130 which has one of its ends connected to conductor 119 intermediate the ends thereof and its other end connected to the other terminal of switch A2.

Switch B2 has one of its terminals connected by a conductor 131 to conductor 114 intermediate the ends thereof, and it has its other terminal connected by a conductor 132 to conductor 118 intermediate the ends thereof.

Selector switch 94, which has one terminal connected to conductor 114 by conductor 115 as previously explained, has a second terminal connected by a conductor 133 to conductor 108 intermediate the ends thereof, a third terminal connected by a conductor 134 to conductor 109 intermediate the ends thereof, and a fourth terminal connected by conductor 135 to one end of the winding of electromagnet D3 the other end of which is connected to power line 90 by a conductor 136.

Switch D2 has one of its terminals connected by a conductor 137 to conductor 113 intermediate the ends thereof and its other terminal connected by conductor 138 to a conductor 139 which connects a terminal of switch 97 to a terminal of switch 98.

Another terminal of switch 97 is connected to a terminal of switch 98 by a conductor 140, a third terminal of switch 97 is connected to a terminal of switch 98 by a conductor 141, and the fourth terminal of switch 97 is connected by a conductor 142 to conductor 128 intermediate the ends thereof.

Semi-automatic operation

Assuming that the machine is idle, that selector switch 94 is adjusted for semi-automatic operation as shown in Fig. 8, that motor pistons 8 and 15 and differential valve member 84 are in the positions shown in Fig. 3, and that pumps 17 and 41 are running, the machine will operate as follows:

When starting switch 95 is closed, electromagnets C4 and A5 will be energized simultaneously, the initial circuit through magnet C4 extending from power line 91 through conductor 107, stop switch 96, conductor 108, starting switch 95, conductor 109, switch C1, conductor 110, switch D1, conductor 111, magnet C4 and conductor 112 to power line 90, and the initial circuit through magnet A5 extending from power line 91 through conductor 107, stop switch 96, conductor 108, starting switch 95, conductors 109 and 123, limit switch 93, conductor 120, switch B1, conductor 121, magnet A5 and conductor 122 to power line 90.

Magnet C4 when energized will open switch C1 and close switches C2 and C3, and magnet A5 when energized will open switch A1 and close switches A2, A3 and A4.

Closing switch C2 will establish a holding circuit which extends from power line 91 through conductor 107, stop switch 96, conductors 108 and 113, switch C2, conductor 110, switch D1, conductor 111, magnet C4 and conductor 112 to power line 90, thereby keeping magnet C4 energized.

Closing switches C3 and A2 will establish a holding circuit which extends from power line 91 through conductor 107, stop switch 96, conductors 108 and 113, switch C3, conductor 114, switch A2, conductors 130 and 129, limit switch 92, conductors 128 and 120, switch B1, conductor 121, magnet A5 and conductor 122 to power line 90, thereby keeping magnet A5 energized.

The above described circuits will be established and magnet A5 will be energized only if slide 6 is in its upper position and holding limit switch 93 in position to form the initial circuit through magnet A5. If slide 6 has descended, limit switch 93 will have operated to break the above circuit and to establish a different circuit the effect of which will be to cause slide 6 to return to its upper position as will presently be explained.

If slide 6 is in its upper position so that the above described circuit can be formed through limit switch 93, closing switches A3 and A4 establishes a circuit from power line 90 through conductor 101, switch A3, conductor 99, the winding of solenoid 60, conductor 100, switch A4 and conductor 102 to power line 91, thereby energizing solenoid 60 which will shift control valve 47 from the position shown in Fig. 3 to the position shown in Fig. 6 so that liquid from gear pump 41 will flow through channel 42 (Fig. 3), valve casing 48 and channels 53 and 54 to cylinder 34 and cause pistons 33 and 35 to move slide block 22 toward the right and thereby cause pump 17 to discharge liquid in to channel 23.

The liquid discharged by pump 17 will flow through channel 23 to cylinder 9 and cause piston 8 to advance slide 5 (Fig. 1) to the limit of its movement and thereby move work carried by slide 5 into position to be broached by a tool carried by slide 6. The liquid expelled from cylinder 9 by piston 8 will flow through channel 24 (Fig. 3) to the intake of pump 17.

When piston 8 reaches the limit of its movement, it operates limit switch 11 to disconnect conductor 116 from conductor 118 (Fig. 8) and to connect conductor 117 to conductor 119, and it also uncovers port 65 (Fig. 4) so that, after slide 5 is fully advanced, liquid may flow from channel 23 through cylinder 9 and channel 67 to bore 69 and shift differential valve member 84 from the position shown in Fig. 3 to the position shown in Fig. 7. The liquid will then flow through chamber 77 and channel 78 to the upper end of cylinder 14 and move piston 15 downward, thereby causing slide 6 to move downward and the tool thereon to take a cut from the work on slide 5.

Piston 15 in moving downward will expel liquid from the lower end of cylinder 14 through channel 72 and resistance valve 76 into channel 74. Since, due to the displacement of piston rod 16, the volume of liquid expelled from the lower end of cylinder 14 is greater than the volume of liquid discharged by pump 17, enough liquid to supply pump 17 will flow from channel 74 through channel 70, check valve 73 and channel 24 to the intake of pump 17. The remainder of the liquid will flow from channel 74 through passages 85 and 86 and the grooves 87 and 81 in the differential valve and then through channel 82, resistance valve 83 and drain channel 55 into reservoir 18, resistance valve 83 resisting the passage of liquid therethrough and thereby causing pump 17 to be supercharged at a pressure equal to the pressure at which valve 83 will close.

After slide 6 has moved downward a short distance it permits limit switch 93 to operate to disconnect conductor 120 from conductor 123 and to connect conductor 118 to conductor 124 but this has no immediate effect. When slide 6 reaches the end of its down stroke, it operates limit switch 92 to disconnect conductor 128 from conductor 129 and to connect conductor 119 to conductor 125.

Disconnecting conductor 128 from conductor 129 causes the magnet A5 to be deenergized so that switch A1 closes and switches A2, A3 and A4 open. Opening switches A3 and A4 deenergizes solenoid 60 and permits spring 56 (Figs. 3 and 6) to return valve 47 to its neutral position, thereby causing the displacement of pump 17 to be reduced to zero as previously explained.

Connecting conductor 119 to conductor 125 and closing switch A1 establishes a circuit from the power line 91 through conductor 107, switch 96, conductors 108 and 113, switch C3, conductors 114 and 117, limit switch 11, conductor 119, limit switch 92, conductor 125, switch A1, conductor 126, magnet B5 and conductor 127 to power line 90, thereby energizing magnet B5 which opens switch B1 and closes switches B2, B3 and B4.

Closing switches B3 and B4 connects conductor 103 to conductor 105 and conductor 104 to conductor 106, thereby energizing solenoid 61 which shifts valve 47 from its neutral position to the position shown in Fig. 5 with the result that pump 17 is caused to discharge liquid into channel 24 as previously explained.

The liquid discharged by pump 17 will flow through channel 24 to the left end of cylinder 9 and cause piston 8 to retract slide 5, the liquid expelled by piston 8 from cylinder 9 flowing through channel 23 to the intake of pump 17. As soon as piston 8 starts to move, it will permit limit switch 14 to operate and, when piston 8 is fully retracted as shown in Fig. 3, it will uncover port 66.

Operating limit switch 11 disconnects conductor 117 from conductor 119 and connects conductor 116 to conductor 118 but this does not permit switch B to operate but simply transfers the control thereof from limit switch 92 to limit switch 93, the circuit then extending from power line 91 through conductor 107, switch 96, conductors 108 and 113, switch C3, conductors 114 and 116, limit switch 11, conductor 118, limit switch 93, conductors 124 and 125, switch A1, conductor 126, magnet B5 and conductor 127 to power line 90, thereby keeping magnet B5 energized when limit switch 92 operates.

As soon as port 66 is uncovered, the liquid delivered by pump 17 to cylinder 9 will flow therethrough and through channel 70, check valve 71 and channel 72 to the lower end of cylinder 14 and move piston 15 and slide 6 upward. Before piston 15 starts upward, the resistance thereof will cause liquid to flow from channel 70 through channel 74 to differential valve casing 68 and move valve member 84 toward the left to the position shown in Fig. 3 so that the liquid expelled from cylinder 14 by piston 15 may flow through channel 78, chamber 77 in casing 68 and channel 74 into channel 70 where it augments the volume of liquid discharged by pump 17 and thereby causes piston 15 to raise slide 6 at high speed.

Just after slide 6 starts upward limit switch 92 will operate to disconnect conductor 119 from conductor 125 and to connect conductor 128 to conductor 129 which has no immediate effect but prepares for the next cycle of operation.

When slide 6 reaches the end of its up stroke, it operates limit switch 93 to connect conductor 120 to conductor 123 and to disconnect conductor 118 from conductor 124 to thereby deenergize magnet B5 and permit switch B1 to close and switches B2, B3 and B4 to open. Opening switches B3 and B4 deenergizes solenoid 61 and permits spring 57 (Figs. 3 and 5) to return valve 47 to its neutral position, thereby causing the displacement of pump 17 to be reduced to zero in the previously described manner and the machine to come to rest with the several parts in positions to start a second cycle of operation.

If the machine is to remain idle for a time, switch 95 is opened to deenergize magnet C4 and thereby permit switch C1 to close and switches C2 and C3 to open. It is also to be noted that, since switch C controls switches A and B, the machine may be stopped at any time and at any point in a cycle of operation by simply opening switch 95.

Automatic operation

If it is desired that the machine operate continuously, selector switch 94 is adjusted to connect conductor 115 to conductor 134. Then when starting switch 95 is closed, switches A and C will be simultaneously operated and the circuits for initially energizing magnets A5 and C4 and for keeping magnet C4 energized will be the same as during semi-automatic operation. The circuit for keeping magnet A5 energized will extend from power line 91 through conductor 107, stop switch 96, conductors 108 and 113, switch C3, conductors 114 and 115, switch 94, conductors 134, 109 and 123, limit switch 93, conductor 120, switch B1, conductor 121, magnet A5 and conductor 122 to power line 90.

As soon as switch A operates, motor 8—9 will advance slide 5 and operate limit switch 11 and then motor 14—15 will move slide 6 downward and permit limit switch 93 to operate as previously explained.

Operating limit switch 11 transfers the control of magnet A5 from limit switch 93 to limit switch 92 by connecting conductor 117 to conductor 119 so that conductor 114, which is carrying current at this time, is connected through conductor 117, limit switch 11, conductors 119, 130 and 129, limit switch 92, conductors 128 and 120, switch B1, conductor 121, magnet A5 and conductor 122 to power line 90, thereby keeping magnet A5 energized when limit switch 93 operates and breaks the connection through which magnet A5 was previously energized.

When slide 6 reaches the end of its down stroke, it operates limit switch 92 to break the connection between conductors 128 and 129 and to connect conductor 119 to conductor 125.

Breaking the connection between conductors 128 and 129 causes switch A to operate and deenergize solenoid 60, and connecting conductor 119 to conductor 125 causes switch B to operate with the result that pump 17 is reversed and the liquid discharged thereby first causes motor 8—9 to retract slide 5 and permit limit switch 11 to operate and transfer the control of switch B from limit switch 92 to limit switch 93 as previously explained.

When slide 5 is fully retracted, piston 8 will uncover port 66 so that liquid will flow to motor 14—15 and cause it to move slide 6 upward and thereby cause limit switch 92 to be operated at the beginning and limit switch 93 to be operated at the end of the up stroke of slide 6 as previously explained.

Since the control of switch B has previously been transferred to limit switch 93, operation of limit switch 92 has no immediate effect but simply prepares for the next cycle of operation.

Limit switch 93 when operated will break the connection between conductors 118 and 124 to thereby deenergize magnet B5 and it will connect conductor 120 to conductor 123 to energize magnet A5 by re-establishing the circuit that was initially established by the operation of switch C in response to the closing of starting switch 95. That is, the circuit for energizing the magnet A5 extends from power line 91 through conductor 107, stop switch 96, conductors 108 and 113, switch C3, conductors 114 and 115, switch 94, conductors 134, 109, and 123, limit switch 93, conductor 120, switch B1, conductor 121, magnet A5 and conductor 122 to power line 90.

Deenergizing magnet B5 and energizing magnet A5 causes pump 17 to be reversed and start slides 5 and 6 on a second cycle of operation. The machine will thus continue to operate until switch 96 is opened to stop the machine.

*Safety control*

If slide 6 is not in its upper position and slide 5 is not fully advanced, closing starting switch 95 will cause slide 6 to move upward instead of causing slide 5 to advance and then slide 6 to move downward. When slide 6 reaches its upper position, it will come to rest if selector switch 94 is adjusted for semi-automatic operation but, if selector switch 94 is adjusted for automatic operation, the machine will continue to operate until stop switch 96 is opened.

The reason that the machine will operate in this manner is that, when slide 6 descends, it permits limit switch 93 to operate and disconnect conductor 123 from conductor 120 and connect conductor 118 to conductor 124.

Closing switch 95 will establish first an energizing circuit and then a holding circuit through magnet C4 in the previously described manner thereby causing switch C1 to open and switches C2 and C3 to close, but disconnecting conductor 123 from conductor 120 prevents magnet A5 from being energized and operating switch A, operation of which causes pump 17 to deliver liquid in a direction to cause slide 5 to be advanced and then slide 6 to move downward as previously explained.

Connecting conductor 118 to conductor 124 establishes a circuit from power line 90 through conductor 107, switch 96, conductors 108 and 113, switch C3, conductors 114 and 116, limit switch 11, conductor 118, limit switch 93, conductors 124 and 125, switch A1, conductor 126, magnet B5 and conductor 127 to power line 90. Magnet B5 is thus energized and closes switches B3 and B4 to energize solenoid 61 and thereby cause pump 17 to deliver liquid in a direction to cause slide 6 to move upward as previously explained.

When slide 6 reaches its upper limit it operates limit switch 93 to disconnect the conductor 118 from conductor 124 and to connect conductor 120 to conductor 123.

Disconnecting conductor 118 from conductor 124 breaks the circuit through magnet B5 and causes the displacement of pump 17 to be reduced to zero in the previously described manner so that, if selector switch 94 is adjusted for semi-automatic operation, slide 6 will stop in its upper position but, if selector switch 94 is adjusted for automatic operation, connecting conductor 120 to conductor 123 will establish a circuit from power line 91 through conductor 107, switch 96, conductors 108 and 113, switch C3, conductors 114 and 115, switch 94, conductors 134, 109 and 123, limit switch 93, conductor 120, switch B1, conductor 121, magnet A5 and conductor 122 to power line 90, thereby causing switch A to operate and initiate a cycle of operation as previously explained.

*Manual operation*

If it is desired to control the machine manually, selector switch 94 is adjusted to connect conductor 133 to conductor 135 and thereby establish a circuit from power line 91 through conductor 107, switch 96, conductors 108 and 133, switch 94, conductor 135, magnet D3 and conductor 136 to power line 90 so that magnet D3 is energized and opens switch D1 and closes switch D2. Opening switch D1 prevents switch C from being operated and consequently prevents it from maintaining a holding circuit through magnet A5 or magnet B5.

When switch 98 is operated to connect conductor 139 to conductor 141, a circuit is established from power line 91 through conductor 107, switch 96 and conductors 108, 113 and 137, switch D2, conductors 138 and 139, switch 98, conductor 141, switch 97, conductors 142, 128 and 120, switch B1, conductor 121, magnet A5 and conductor 122 to power line 90, so that magnet A5 is energized and closes switches A3 and A4 to energize solenoid 60 and thereby cause pump 17 to deliver liquid in a direction to cause slide 5 to be advanced and slide 6 to descend.

When switch 97 is operated to connect conductor 139 to conductor 140, a circuit is established from power line 91 through conductor 107, switch 96, conductors 108, 113 and 137, switch D2, conductors 138 and 139, switch 97, conductor 140, switch 98, conductor 125, switch A1, conductor 126, magnet B5 and conductor 127 to power line 90 so that magnet B5 is energized and closes switches B3 and B4 to energize solenoid 61 and thereby cause pump 17 to deliver liquid in a direction to cause slide 5 to be retracted and slide 6 to be moved upward.

The invention herein set forth is susceptible of various modifications without departing from the scope thereof as hereafter claimed.

The invention is hereby claimed as follows:

1. The combination, with a machine having a first carriage, a first power means for reciprocating said carriage between a fully retracted and a fully advanced position, a second carriage, and a second power means for reciprocating said second carriage between a fully retracted and a fully advanced position, of starting means, a first control means for causing said first power means to advance said first carriage in response to operation of said starting means, a second control means responsive to said first carriage reaching its fully advanced position for causing said second power means to advance said second carriage, a third control means for causing said second power means to retract said second carriage, and means responsive to said second carriage leaving its fully retracted position before said first carriage advances for rendering said first control means ineffective and said third control means effective to thereby prevent said first power means from advancing said first carriage and to cause said second power means to retract said second carriage upon said starting means being operated.

2. The combination, with a machine having a first carriage, a first power means for reciprocating said carriage between a fully retracted and a fully advanced position, a second carriage, and a second power means for reciprocating said second carriage between a fully retracted and a fully advanced position, of a plurality of control means for causing said power means to at first advance said first carriage and said second carriage in sequence and to then retract said first carriage and said second carriage in sequence to thereby complete a cycle of operation, and manually operable starting means for initiating a cycle of operation, said control means including means responsive to said second carriage leaving its fully retracted position before said first carriage advances for transferring control of said power means from one to another of said control means to thereby prevent said first power means from advancing said first carriage and to cause said second power means to retract said second carriage upon said starting means being operated.

3. The combination, with a machine having a first carriage, a first power means for reciprocating said carriage between a fully retracted and a fully advanced position, a second carriage, and a second power means for reciprocating said second carriage between a fully retracted and a fully advanced position, of means for supplying power to said power means to energize the same including reversing means for directing power to said first power means and for reversing the same, manually operable starting means for operating said reversing means to thereby cause said first power means to advance said first carriage, means responsive to said first carriage reaching its fully advanced position for causing said second power means to advance said second carriage, a first control means responsive to said second carriage reaching its fully advanced position for operating said reversing means to thereby cause said first power means to retract said first carriage, means responsive to said first carriage reaching its fully retracted position for causing said second power means to retract said second carriage, a second control means responsive to said second carriage reaching its fully retracted position for operating said reversing means, and means operated by said first carriage at the end of its movement in each direction for transferring the control of said reversing means from one to the other of said control means.

4. The combination, with a machine having a first carriage and a second carriage, of a first hydraulic motor for reciprocating said first carriage between a fully retracted position and a fully advanced position, a second hydraulic motor for reciprocating said second carriage between a fully retracted position and a fully advanced position, a pump for supplying liquid to said motors to energize the same, means connecting said first motor to said second motor and to said pump and forming therewith a hydraulic circuit for sequential operation of said motors, means for reversing the direction of flow in said circuit and for reducing said flow to zero, said first motor also functioning as a valve to cause liquid discharged by said pump to first operate said first motor and to then operate said second motor in either direction of flow, manually operable starting means for effecting operation of said reversing means in a direction to cause liquid from said pump to flow in a direction to cause said motors to advance said carriages, and means responsive to said second carriage leaving its fully retracted position before said starting means is operated for causing said starting means to effect operation of said reversing means in the opposite direction and thereby cause liquid from said pump to flow in a direction to cause said second motor to move said second carriage to its fully retracted position.

5. The combination, with a machine having a first carriage and a second carriage, of a first hydraulic motor for reciprocating said first carriage between a fully retracted position and a fully advanced position, a second hydraulic motor for reciprocating said second carriage between a fully retracted position and a fully advanced position, a pump for supplying liquid to said motors to energize the same, means connecting said first motor to said second motor and to said pump and forming therewith a hydraulic circuit for sequential operation of said motors, means for reversing the direction of flow in said circuit and for reducing said flow to zero, said first motor also functioning as a valve to cause liquid discharged by said pump to first operate said first motor and to then operate said second motor in either direction of flow, manually operable starting means for effecting operation of said reversing means in a direction to cause liquid from said pump to flow in a direction to cause said motors to advance said carriages, control means operable in response to said second carriage reaching its fully advanced position for effecting operation of said reversing means, control means operable in response to said second carriage reaching its fully retracted position for effecting operation of said reversing means, and means operable in response to movement of said first carriage in each direction for transferring control of said reversing means from one to the other of said control means.

6. The combination, with a machine having a first carriage and a second carriage, of a reversible pump, a first hydraulic motor comprising a cylinder having its opposite ends connected to opposite sides of said pump and a piston fitted in said cylinder for reciprocating said first carriage between a fully retracted position and a fully advanced position, a second hydraulic motor comprising a cylinder having its opposite ends connected to the cylinder of said first motor at spaced apart points intermediate the ends thereof and a piston fitted in said cylinder for reciprocating said second carriage between a fully retracted position and a fully advanced position whereby said first motor also functions as a valve to cause liquid discharged by said pump in either direction to first operate said first motor and then operate said second motor, hydraulic means for adjusting said pump, means for supplying motive liquid to said hydraulic means including a control valve normally retained in a first position in which it causes said hydraulic means to reduce pump delivery to zero and shiftable either to a second position in which it causes said hydraulic means to adjust said pump to deliver liquid in a direction to cause said motors to advance said carriages in sequence or to a third position in which it causes said hydraulic means to adjust said pump to deliver liquid in a direction to cause said motors to retract said carriages in sequence, means including manually operable starting means for causing said valve to shift to its second position to thereby cause said carriages to advance, and means responsive to said second carriage leaving its fully retracted position before said starting means is operated for causing said valve to be shifted to its third position when said starting means is operated and thereby cause said second carriage to be returned to its fully retracted position.

7. The combination, with a machine having a first carriage and a second carriage, of a reversible pump, a first hydraulic motor comprising a cylinder having its opposite ends connected to opposite sides of said pump and a piston fitted in said cylinder for reciprocating said first carriage between a fully retracted position and a fully advanced position, a second hydraulic motor comprising a cylinder having its opposite ends connected to the cylinder of said first motor at spaced apart points intermediate the ends thereof and a piston fitted in said cylinder for reciprocating said second carriage between a fully retracted position and a fully advanced position whereby said first motor also functions as a valve to cause liquid discharged by said pump in either direction to first operate said first motor and then operate said second motor, hydraulic means for adjusting said pump, means for supplying motive liquid to said hydraulic means including a control valve normally retained in a first position in which it causes said hydraulic means to reduce pump delivery to zero and shiftable either to a second position in which it causes said hydraulic means to adjust said pump to deliver liquid in a direction to cause said motors to advance said carriages in sequence or to a third position in which it causes said hydraulic means to adjust said pump to deliver liquid in a direction to cause said motors to retract said carriages in sequence, a plurality of control means for causing said valve to be shifted first to its second position and then to its third position to thereby cause said carriages to be advanced in sequence and then to be retracted in sequence to complete a cycle of operation, and manually operable starting means for initiating a cycle of operation, said control means including means responsive to said second carriage leaving its fully retracted position before said starting means is operated for causing said valve to be shifted to its third position when said starting means is operated and thereby cause said second carriage to be returned to its fully retracted position.

8. The combination, with a machine having a first carriage and a second carriage, of a reversible pump, a first hydraulic motor comprising a cylinder having its opposite ends connected to opposite sides of said pump and a piston fitted in said cylinder for reciprocating said first carriage between a fully retracted position and a fully advanced position, a second hydraulic motor comprising a cylinder having its opposite ends connected to the cylinder of said first motor at spaced apart points intermediate the ends thereof and a piston fitted in said cylinder for reciprocating said second carriage between a fully retracted position and a fully advanced position, whereby said first motor also functions as a valve to cause liquid discharged by said pump in either direction to first operate said first motor and then operate said second motor, hydraulic means for adjusting said pump, means for supplying motive liquid to said hydraulic means including a control valve normally retained in a first position in which it causes said hydraulic means to reduce pump delivery to zero and shiftable either to a second position in which it causes said hydraulic means to adjust said pump to deliver liquid in a direction to cause said motors to advance said carriages in sequence or to a third position in which it causes said hydraulic means to adjust said pump to deliver liquid in a direction to cause said motors to retract said carriages in sequence, means for shifting said valve, means including manually operable starting means for causing said valve shifting means to shift said valve to its second position to thereby cause said carriage to advance in sequence, control means operable in response to said second carriage reaching its fully advanced position for operating said valve shifting means to cause said valve to be shifted to its third position and thereby cause said carriages to be retracted in sequence, control means operable in response to said second carriage reaching its fully retracted position for operating said valve shifting means, and means operable in response to movement of said first carriage in each direction for transferring control of said valve shifting means from one to the other of said control means.

9. The combination, with a machine having a first carriage, a first power driven means for reciprocating said carriage between a fully retracted position and a fully advanced position, a second carriage, and a second power driven means for reciprocating said second carriage between a fully retracted position and a fully advanced position, of a power source, means including a first electromagnet adapted when energized to direct power from said source to said first power driven means to cause it to advance said first carriage, means including a starting switch adapted when closed to energize said magnet, means responsive to said first carriage reaching its fully advanced position for directing power to said second power driven means to cause it to advance said second carriage, means including a second electromagnet adapted when energized to direct power from said source to said first power driven means to cause it to retract said first carriage, a limit switch operable in response to said second carriage reaching its fully advanced position for deenergizing said first magnet and energizing said second magnet to thereby effect reversal of said carriages, and means responsive to said second carriage leaving its fully retracted position before said starting switch is closed for causing said starting switch when closed to energize said second magnet instead of said first magnet and thereby cause said second carriage to be returned to its fully retracted position.

10. The combination, with a machine having a first carriage, a first power driven means for reciprocating said carriage between a fully retracted position and a fully advanced position, a second carriage, and a second power driven means for reciprocating said second carriage between a fully retracted position and a fully advanced position, of a power source, means including a first electromagnet adapted when energized to direct power from said source to said first power driven means to cause it to advance said first carriage, means including a starting switch adapted when closed to energize said magnet means responsive to said first carriage reaching its fully advanced position for directing power to said second power driven means to cause it to advance said second carriage, means including a second electromagnet adapted when energized to direct power from said source to said first power driven means to cause it to retract said first carriage, a first limit switch operable in response to said second carriage reaching its fully advanced position for deenergizing said first magnet and energizing said second magnet to thereby effect reversal of said first carriage, means responsive to said first carriage reaching its fully retracted position for directing power to said second power driven means to cause it to retract said second carriage, a second limit switch operable in response to said second carriage reaching its fully retracted position for deenergizing said second magnet, and a third limit switch operable in response to movement of said first carriage in each direction for changing the connections between the other limit switches and said magnets to thereby cause said second magnet to be energized and said second carriage to be returned to its fully retracted position in response to said starting switch being closed in case said second carriage has descended and said second limit switch has operated before said first carriage has advanced.

11. The combination, with a machine having a first carriage and a second carriage, of a first hydraulic motor for reciprocating said first carriage between a fully retracted position and a fully advanced position, a second hydraulic motor for reciprocating said second carriage between a fully retracted position and a fully advanced position, a pump for supplying liquid to said motors to energize the same, means connecting said first motor to said second motor and to said pump and forming therewith a hydraulic circuit for sequential operation of said motors, means for controlling the direction of flow of liquid in said circuit including a first electromagnet adapted when energized to cause liquid to flow in one direction and thereby cause said first motor to advance said first carriage and then said second motor to advance said second carriage and a second electromagnet adapted when energized to cause liquid to flow in the opposite direction and thereby cause said first motor to retract said first carriage and then said second motor to retract said second carriage, there being no flow in said circuit when both magnets are deenergized, means including a starting switch for energizing said first magnet, a first limit switch operable in response to said second carriage reaching its fully advanced position for deenergizing said first magnet and energizing said second magnet to thereby effect reversal of said carriages, a second limit switch operable in response to said second carriage reaching its fully retracted position for deenergizing said second magnet, and means responsive to said second carriage leaving its fully retracted position before said starting switch is closed for causing said starting switch when closed to energize said second magnet instead of said first magnet and thereby cause said second carriage to be returned to its fully retracted position.

12. The combination, with a machine having a first carriage and a second carriage, of a first hydraulic motor for reciprocating said first carriage between a fully retracted position and a fully advanced position, a second hydraulic motor for reciprocating said second carriage between a fully retracted position and a fully advanced position, a pump for supplying liquid to said motor to energize the same, means connecting said first motor to said second motor and to said pump and forming therewith a hydraulic circuit for sequential operation of said motors, means for controlling the direction of flow of liquid in said circuit including a first electromagnet adapted when energized to cause liquid to flow in one direction and thereby cause said first motor to advance said first carriage and then said second motor to advance said second carriage and a second electromagnet adapted when energized to cause liquid to flow in the opposite direction and thereby cause said first motor to retract said first carriage and then said second motor to retract said second carriage, there being no flow in said circuit when both magnets are deenergized, means including a starting switch for energizing said first magnet, a first limit switch operable in response to said second carriage reaching its fully advanced position for deenergizing said first magnet and energizing said second magnet to thereby effect reversal of said carriages, a second limit switch operable in response to said second carriage reaching its fully retracted position for deenergizing said second magnet, and a third limit switch operable in response to movement of said first carriage in each direction for transferring control of said first magnet from said first limit switch to said second limit switch whereby said second carriage descending and said second limit switch operating before said third limit switch is operated and in response to said first carriage advancing will cause said first magnet to be energized and said second carriage returned to its fully retracted position in response to said starting switch being closed.

13. The combination, with a machine having a first carriage and a second carriage, of a reversible pump, a first hydraulic motor comprising a cylinder having its opposite ends connected to opposite sides of said pump and a piston fitted in said cylinder for reciprocating said first carriage between a fully retracted and a fully advanced position, a second hydraulic motor comprising a cylinder having its opposite ends connected to the cylinder of said first motor at spaced apart points intermediate the ends thereof and a piston fitted in said cylinder for reciprocating said second carriage between a fully retracted and a fully advanced position whereby said first motor also functions as a valve to cause liquid discharged by said pump in either direction to first operate said first motor and then operate said second motor, hydraulic means for adjusting said pump, means for supplying motive liquid to said hydraulic means including a control valve normally retained in a first position in which it causes said hydraulic means to reduce pump delivery to zero and shiftable either to a second position in which it causes said hydraulic means to adjust said pump to deliver liquid in a direction to cause said motors to advance said carriages in sequence or to a third position in which it causes said hydraulic means to adjust said pump to deliver liquid in a direction to cause said motors to retract said carriages in sequence, a first electromagnet adapted when energized to shift said valve to its second position, a second electromagnet adapted when energized to shift said valve to its third position, means including a starting switch for initially energizing said first magnet in response to said switch being closed, a first limit switch operable in response to said second carriage reaching its fully advanced position for deenergizing said first magnet and energizing said second magnet to thereby effect reversal of said carriages, a second limit switch operable in response to said second carriage reaching its fully retracted position for deenergizing said second magnet, and means responsive to said second carriage leaving its fully retracted position before said starting switch is closed for causing said starting switch when closed to energize said second magnet instead of said first magnet and thereby cause said second carriage to be returned to its fully retracted position.

14. The combination, with a machine having a first carriage and a second carriage, of a reversible pump, a first hydraulic motor comprising a cylinder having its opposite ends connected to opposite sides of said pump and a piston fitted in said cylinder for reciprocating said first carriage between a fully retracted and a fully advanced position, a second hydraulic motor comprising a cylinder having its opposite ends connected to the cylinder of said first motor at spaced apart points intermediate the ends thereof and a piston fitted in said cylinder for reciprocating said second carriage between a fully retracted and a fully advanced position whereby said first motor also functions as a valve to cause liquid discharged by said pump in either direction to first operate said first motor and then operate said second motor, hydraulic means for adjusting said pump, means for supplying motive liquid to said hydraulic means including a control valve normally retained in a first position in which it causes said hydraulic means to reduce pump delivery to zero and shiftable either to a second position in which it causes said hydraulic means to adjust said pump to deliver liquid in a direction to cause said motors to advance said carriages in sequence or to a third position in which it causes said hydraulic means to adjust said pump to deliver liquid in a direction to cause said motors to retract said carriages in sequence, a first electromagnet adapted when energized to shift said valve to its second position, a second electromagnet adapted when energized to shift said valve to its third position, and a plurality of control means for causing said first magnet to be energized and then causing said first magnet to be deenergized and said second magnet to be energized to thereby cause said carriage to be advanced in sequence and then to be retracted in sequence to complete a cycle of operation, said control means including a manually operable switch for initiating a cycle of operation and means responsive to said second carriage leaving its fully retracted position before said starting switch is operated for causing said second magnet to be energized when said starting switch is operated and thereby cause said second carriage to be returned to its fully retracted position.

15. The combination, with a machine having a first carriage and a second carriage, of a reversible pump, a first hydraulic motor comprising a cylinder having its opposite ends connected to opposite sides of said pump and a piston fitted in said cylinder for reciprocating said first carriage between a fully retracted and a fully advanced position, a second hydraulic motor comprising a cylinder having its opposite ends connected to the cylinder of said first motor at spaced apart points intermediate the ends thereof and a piston fitted in said cylinder for reciprocating said second carriage between a fully retracted and a fully advanced position whereby said first motor also functions as a valve to cause liquid discharged by said pump in either direction to first operate said first motor and then operate said second motor, hydraulic means for adjusting said pump, means for supplying motive liquid to said hydraulic means including a control valve normally retained in a first position in which it causes said hydraulic means to reduce pump delivery to zero and shiftable either to a second position in which it causes said hydraulic means to adjust said pump to deliver liquid in a direction to cause said motors to advance said carriages in sequence or to a third position in which it causes said hydraulic means to adjust said pump to deliver liquid in a direction to cause said motors to retract said carriages in sequence, a first electromagnet adapted when energized to shift said valve to its second position, a second electromagnet adapted when energized to shift said valve to its third position, means including a starting switch for initially energizing said first magnet in response to said switch being closed, a first limit switch operable in response to said second carriage reaching its fully advanced position for deenergizing said first magnet and energizing said second magnet to thereby effect reversal of said carriages, a second limit switch operable in response to said second carriage reaching its fully retracted position for deenergizing said second magnet, and a third limit switch operable in response to movement of said first carriage in each direction for transferring control of said first magnet from said first limit switch to said second limit switch whereby said second carriage descending and said second limit switch operating before said third limit switch is operated in response to said first carriage advancing will cause said first magnet to be energized and said second carriage returned to its fully retracted position in response to said starting switch being closed.

16. The combination, with a machine having a first carriage and a second carriage, of a first hydraulic motor for reciprocating said first carriage between a fully retracted position and a fully advanced position, a second hydraulic motor for reciprocating said second carriage between a fully retracted position and a fully advanced position, a pump for supplying liquid to said motor to energize the same, means connecting said first motor to said second motor and to said pump and forming therewith a hydraulic circuit for sequential operation of said motors, means for controlling the direction of flow of liquid in said circuit including a first electromagnet adapted when energized to cause liquid to flow in one direction and thereby cause said first motor to advance said first carriage and then said second motor to advance said second carriage and a second electromagnet adapted when energized to cause liquid to flow in the opposite direction and thereby cause said first motor to retract said first carriage and then said second motor to retract said second carriage, there being no flow in said circuit when both magnets are deenergized, means including a starting switch for energizing said first magnet, a first limit switch operable in response to said second carriage reaching its fully advanced position for deenergizing said first magnet and energizing said second magnet to thereby effect reversal of said carriages, a second limit switch operable in response to said second carriage reaching its fully retracted position for deenergizing said second magnet to thereby cause said second carriage to stop when fully retracted, a selector switch connected in circuit with said second limit switch and operable to enable said second limit switch to energize said first magnet at the same time that it deenergizes said second magnet to thereby cause said machine to operate continuously until stopped by the operator, and means responsive to said second carriage leaving its fully retracted position before said starting switch is closed for causing said starting switch when closed to energize said second magnet instead of said first magnet and thereby cause said second carriage to be returned to its fully retracted position.

17. The combination, with a machine having a first carriage and a second carriage, of a first hydraulic motor for reciprocating said first carriage between a fully retracted position and a fully advanced position, a second hydraulic motor for reciprocating said second carriage between a fully retracted position and a fully advanced position, a pump for supplying liquid to said motor to energize the same, means connecting said first motor to said second motor and to said pump and forming therewith a hydraulic circuit for sequential operation of said motors, means for controlling the direction of flow of liquid in said circuit including a first electromagnet adapted when energized to cause liquid to flow in one direction and thereby cause said first motor to advance said first carriage and then said second motor to advance said second carriage and a second electromagnet adapted when energized to cause liquid to flow in the opposite direction and thereby cause said first motor to retract said first carriage and then said second motor to retract said second carriage, there being no flow in said circuit when both magnets are deenergized, means including a starting switch for energizing said first magnet, a first limit switch operable in response to said second carriage reaching its fully advanced position for deenergizing said first magnet and energizing said second magnet to thereby effect reversal of said carriages, a second limit switch operable in response to said second carriage reaching its fully retracted position for deenergizing said second magnet to thereby cause said second carriage to stop when fully retracted, a selector switch connected in circuit with said second limit switch and operable to enable said second limit switch to energize said first magnet at the same time that it deenergizes said second magnet to thereby cause said machine to operate continuously until stopped by the operator, and a third limit switch operable in response to movement of said first carriage in each direction for transferring control of said first magnet from said first limit switch to said second limit switch whereby said second carriage descending and said second limit switch operating before said third limit switch is operated in response to said first carriage advancing will cause said first magnet to be energized and said second carriage returned to its fully retracted position in response to said starting switch being closed.

18. The combination with a machine having a first carriage and a second carriage, of a reversible pump, a first hydraulic motor comprising a cylinder having its opposite ends connected to opposite sides of said pump and a piston fitted in said cylinder for reciprocating said first carriage between a fully retracted and a fully advanced position, a second hydraulic motor comprising a cylinder having its opposite ends connected to the cylinder of said first motor at spaced apart points intermediate the ends thereof and a piston fitted in said cylinder for reciprocating said second carriage between a fully retracted and a fully advanced position whereby said first motor also functions as a valve to cause liquid discharged by said pump in either direction to first operate said first motor and then operate said second motor, hydraulic means for adjusting said pump, means for supplying motive liquid to said hydraulic means including a control valve normally retained in a first position in which it causes said hydraulic means to reduce pump delivery to zero and shiftable either to a second position in which it causes said hydraulic means to adjust said pump to deliver liquid in a direction to cause said motors to advance said carriages in sequence or to a third position in which it causes said hydraulic means to adjust said pump to deliver liquid in a direction to cause said motors to retract said carriages in sequence, a first electromagnet adapted when energized to shift said valve to its second position, a second electromagnet adapted when energized to shift said valve to its third position, means including a starting switch for initially energizing said first magnet in response to said switch being closed, a first limit switch operable in response to said second carriage reaching its fully advanced position for deenergizing said first magnet and energizing said second magnet to thereby effect reversal of said carriages, a second limit switch operable in response to said second carriage reaching its fully retracted position for deenergizing said second magnet to thereby cause said second carriage to stop when fully retracted, a selector switch connected in circuit with said second limit switch and operable to enable said second limit switch to energize said first magnet at the same time that it deenergizes said second magnet to thereby cause said machine to operate continuously until stopped by the operator, and means responsive to said second carriage leaving its fully retracted position before said starting switch is closed for causing said starting switch when closed to energize said second magnet instead of said first magnet and thereby cause said second carriage to be returned to its fully retracted position.

19. The combination, with a machine having a first carriage and a second carriage, of a reversible pump, a first hydraulic motor comprising a cylinder having its opposite ends connected to opposite sides of said pump and a piston fitted in said cylinder for reciprocating said first carriage between a fully retracted and a fully advanced position, a second hydraulic motor comprising a cylinder having its opposite ends connected to the cylinder of said first motor at spaced apart points intermediate the ends thereof and a piston fitted in said cylinder for reciprocating said second carriage between a fully retracted and a fully advanced position whereby said first motor also functions as a valve to cause liquid discharged by said pump in either direction to first operate said first motor and then operate said second motor, hydraulic means for adjusting said pump, means for supplying motive liquid to said hydraulic means including a control valve normally retained in a first position in which it causes said hydraulic means to reduce pump delivery to zero and shiftable either to a second position in which it causes said hydraulic means to adjust said pump to deliver liquid in a direction to cause said motors to advance said carriages in sequence or to a third position in which it causes said hydraulic means to adjust said pump to deliver liquid in a direction to cause said motors to retract said carriages in sequence, a first electromagnet adapted when energized to shift said valve to its second position, a second electromagnet adapted when energized to shift said valve to its third position, means including a starting switch for initially energizing said first magnet in response to said switch being closed, a first limit switch operable in response to said second carriage reaching its fully advanced position for deenergizing said first magnet and energizing said second magnet to thereby effect reversal of said carriages, a second limit switch operable in response to said second carriage reaching its fully retracted position for deenergizing said second magnet to thereby cause said second carriage to stop when fully retracted, a selector switch connected in circuit with said second limit switch and operable to enable said second limit switch to energize said first magnet at the same time that it deenergizes said second magnet to thereby cause said machine to operate continuously until stopped by the operator, and a third limit switch operable in response to movement of said first carriage in each direction for transferring control of said first magnet from said first limit switch to said second limit switch whereby said second carriage descending and said second limit switch operating before said third limit switch is operated in response to said first carriage advancing will cause said first magnet to be energized and said second carriage returned to its fully retracted position in response to said starting switch being closed.

RICHARD E. DAVIS.